United States Patent
Kim et al.

(10) Patent No.: US 9,368,147 B2
(45) Date of Patent: Jun. 14, 2016

(54) MEDIA AND DRIVE VALIDATION IN A STORAGE LIBRARY

(71) Applicant: Oracle International Corporation, Redwood City, CA (US)

(72) Inventors: Hyoungjin Kim, Redwood City, CA (US); Alex Amador, Arvada, CO (US); Stephanie Lynn Russell, Redwood City, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 90 days.

(21) Appl. No.: 14/039,472

(22) Filed: Sep. 27, 2013

(65) Prior Publication Data

US 2015/0092298 A1   Apr. 2, 2015

(51) Int. Cl.
*G11B 15/68* (2006.01)
*G06F 21/00* (2013.01)
*G06F 3/06* (2006.01)

(52) U.S. Cl.
CPC .......... *G11B 15/6835* (2013.01); *G06F 3/0604* (2013.01); *G06F 3/0634* (2013.01); *G06F 3/0686* (2013.01); *G06F 21/00* (2013.01)

(58) Field of Classification Search
CPC . G11B 15/6835; G06F 3/0604; G06F 3/0634; G06F 3/0686; G06F 21/00
See application file for complete search history.

(56) References Cited

U.S. PATENT DOCUMENTS

| | | | | |
|---|---|---|---|---|
| 5,388,260 | A * | 2/1995 | Monahan et al. | 711/1 |
| 6,467,054 | B1 * | 10/2002 | Lenny | 714/42 |
| 6,725,394 | B1 * | 4/2004 | Bolt | 714/5.11 |
| 8,341,198 | B1 * | 12/2012 | Havewala | G06F 17/30233 707/674 |
| 2002/0144048 | A1 * | 10/2002 | Bolt | 711/4 |
| 2003/0126361 | A1 * | 7/2003 | Slater et al. | 711/114 |
| 2012/0076622 | A1 * | 3/2012 | Starr et al. | 414/273 |
| 2013/0086022 | A1 * | 4/2013 | Black, III | G11B 27/36 707/705 |
| 2013/0212345 | A1 * | 8/2013 | Nakajima | 711/161 |

* cited by examiner

*Primary Examiner* — Eric Oberly
(74) *Attorney, Agent, or Firm* — Marsh Fischmann & Breyfogle LLP; Daniel J. Sherwinter (57) ABSTRACT

Systems and methods are described for validating storage media and/or media drives in a storage library using a hidden drive pool and a non-hidden media pool. For example, a storage library can be instructed to perform media/drive validation (MDV) on a selected pool of physical storage media using a selected pool of drive resources. Embodiments handle the pools so that, at least during performance of MDV, the drive resources in the drive pool are not visible to the host applications, but the storage media is still visible and can still be accessed by the host application. For example, the MDV can be performed in such a way that the host application cannot task a drive being used for validation, but the host application can perform operations on storage media in the media validation pool. Further, some embodiments operate in the context of storage library complex-wide validation pools.

19 Claims, 6 Drawing Sheets

MEDIA AND DRIVE VALIDATION IN A STORAGE LIBRARY

FIELD

Embodiments relate generally to data storage systems, and, more particularly, to validation of physical storage media and/or media drives in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic assembly finds the appropriate cartridge, removes the cartridge from its magazine, and carries the cartridge to a media drive that is designed to receive the cartridge and read its contents. Some storage libraries have multiple drives that can operate concurrently to perform input/output operations on multiple cartridges.

The logical reliability of the storage library (i.e., the ability to reliably store and retrieve data) can depend largely on the physical integrity of the storage media and the media drives that read and/or write to that storage media. For example, age, environmental factors, read/write cycles, and other conditions can reduce the integrity of data stored on physical storage media (e.g., magnetic tape). If the storage library and/or its users can maintain awareness of which storage media and/or media drives are more or less reliable, various actions can be taken to improve the overall reliability of the storage library. For example, data can be moved from less reliable to more reliable storage media before the less reliable storage media fails (or appreciably slows operation of the library, etc.), a certain unreliable drive can be avoided until it is repaired or replaced, etc. Still, it is typically desirable for any media validation tasks to be performed in a manner that is relatively transparent to host applications that use the storage library. For example, users may not want to interrupt or otherwise interfere with data processing, backup, or other operations for long periods of time while waiting for media to become validated.

BRIEF SUMMARY

Among other things, systems and methods are described for validating storage media and/or media drives in a storage library using a hidden drive pool and a non-hidden media pool. Some embodiments operate in context of a data storage library having a robotic assembly that finds, picks, and places media cartridges in media slots (e.g., in magazines) and/or media drives to fulfill requests by one or more host applications (e.g., backup applications). The data storage library can be instructed (e.g., by a local interface, an automated analytics system, an external application interface, etc.) to perform media validation on a particular pool of physical storage media using a particular pool of drive resources (e.g., physical drives and/or logical drive slots). Embodiments handle the pools so that, at least during performance of media validation, the drive resources in the drive pool are not visible to the host applications, but the storage media is still visible and can still be accessed by the host application. For example, the media validation can be performed in such a way that the host application cannot task a drive being used for validation, but the host application can perform input/output operations on storage media in the media validation pool (e.g., by asynchronously interrupting the validation of affected media, as requested). Further, some embodiments operate in the context of storage library complexes (i.e., a logically integrated set of physically distinct storage libraries) to allow assignment of drive and/or media resource pools from across the complex.

According to one set of embodiments, a storage library system is provided. The system includes: a number of media slots, at least some having tangible storage media disposed therein; a number of media drives that operate to receive one of the storage tangible medium for reading or writing; a robotic assembly that operates to ferry the storage media between the media slots and the media drives; and at least one processor that operates to communicate with the robotic assembly and at least one host application. The at least one processor operates to perform steps including: assigning a selected set of the storage media to a target media pool in a manner that maintains visibility of the selected set of storage media by the at least one host application; and assigning a selected set of media drive resources to a target drive resource pool in a manner that hides visibility of the selected set of media drive resources from the at least one host application. In some such embodiments, the at least one processor further operates to: instruct the robotic assembly to move at least one of the selected set of storage media to a drive slot of one of the plurality of media drives associated with one of the selected set of media drive resources; and instruct the one of the selected set of media drive resources to execute a media validation using the at least one of the selected set of storage media.

According to another set of embodiments, a method is provided for validating storage media and/or media drives in a storage library, where the library in communication with at least one host application and has a number of storage media and a number of media drives. The method includes: assigning a selected set of storage media from the library to a target media pool in a manner that maintains visibility of the selected set of storage media by the at least one host application; assigning a selected set of media drive resources from the library to a target drive resource pool in a manner that hides visibility of the selected set of media drive resources from the at least one host application; instructing the storage library to move at least one of the selected set of storage media to one of the selected set of media drive resources; and instructing the one of the selected set of media drive resources to execute a media/drive validation using the at least one of the selected set of storage media.

BRIEF DESCRIPTION OF THE DRAWINGS

The present disclosure is described in conjunction with the appended figures:\

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Often, the logical reliability of a storage library (i.e., the ability to reliably store and retrieve data) can depend on the physical integrity of the storage media and the media drives that read and/or write to that storage media. By maintaining an awareness of which storage media and/or media drives are more or less reliable, various actions can be taken to improve the overall reliability of the storage library, such as migrating data from less reliable to more reliable storage media, avoiding unreliable drives, etc. Still, it is typically desirable for any media validation tasks to be performed in a manner that does not interfere with ordinary host-level usage of the storage library (e.g., data processing, backup, or other operations). Some embodiments described herein include systems and methods that implement media and/or drive validation (MDV) in a storage library in a manner that avoids interference with and by host applications. For example, a data storage library can be instructed to perform MDV on a particular pool of physical storage media using a particular pool of drive resources (e.g., physical drives and/or logical drive slots). Embodiments handle the pools so that, at least during performance of MDV, the drive resources in the drive pool are not visible to the host applications, but the storage media is still visible and can still be accessed by the host application.

Figure 1:
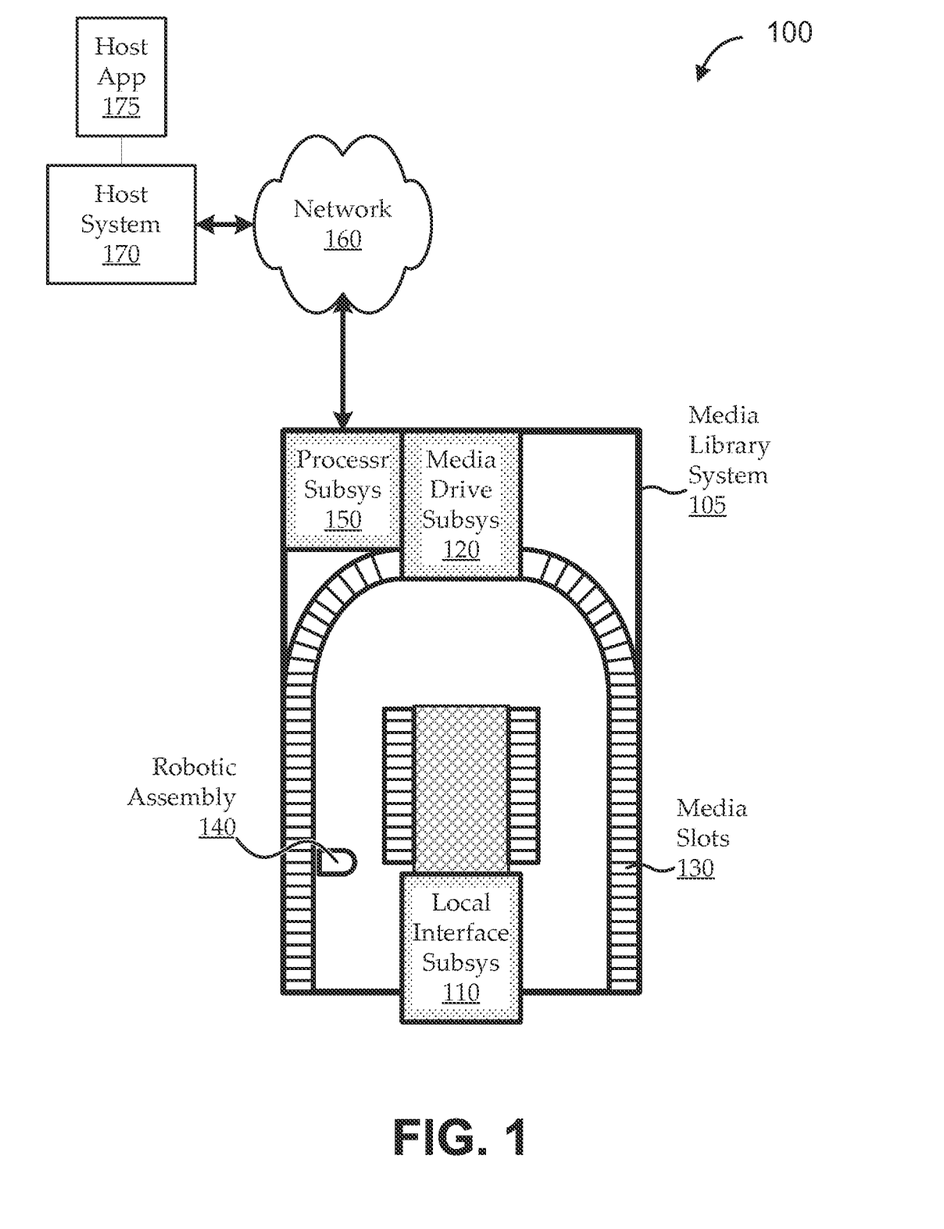
FIG. 1 shows a simplified diagram of a data storage system that provides illustrative context for various embodiments.

FIG. 1 shows a simplified diagram of a data storage system 100 that provides illustrative context for various embodiments. The data storage system 100 illustrated in FIG. 1 is intended only to provide one illustrative context, and is not intended to limit the scope of embodiments to any particular library architecture, components, arrangement of components, etc. While embodiments are described with reference to particular tape media storage libraries (e.g., using tape cartridges to store data), similar techniques can be applied in any suitable context, including, for example, other types of tape media storage libraries, other storage libraries that use multiple physical non-tape storage media, etc.

The data storage system 100 includes a media library system 105 that has a number of storage media (e.g., tape cartridges, or the like) located in media slots 130. One or more robotic assemblies 140 in the media library system 105 can pick and place the storage media, including ferrying the storage media between the media slots 130 and one or more media drives in a media drive subsystem 120. Some embodiments permit a user to directly interface with the media library system 105 via a local interface subsystem 110. Operations of the media library system 105, including certain functionality of the local interface subsystem 110, the media drive subsystem 120, the robotic assemblies 140, etc. can be controlled by a processor subsystem 150. For example, the processor subsystem 150 can include one or more processors in one or more locations throughout the media library system 105 that are in communication with one or more memories having instructions stored thereon, which, when executed, cause the processors to perform certain functionality.

In some embodiments, the media library system 105 includes a large number of media slots 130 arranged in arrays of rows and columns. Some or all of the media slots 130 hold storage media. For example, one implementation has 1,448 media slots 130, and expansion modules can be used to increase the capacity to up to 10,088 slots. Another implementation has 200 media slots 130, and expansion modules can be used to increase the capacity to up to 5,925 slots. The media library system 105 can also include a number of drive slots, with some or all of the drive slots holding media drives. For example, one implementation includes 64 drive slots in the media drive subsystem 120. Another implementation includes 24 drive slots, and can be expanded to up to 56 drive slots. Rails or other structure allows multiple robotic assemblies 140 to traverse the arrays of media slots 130 and drive slots, so that hand assemblies of the robotic assemblies 140 (e.g., "handbots") can perform pick and place operations on the storage media in the media slots 130 and/or media drives. For example, one implementation includes four handbots that ride on horizontal and vertical rails, so that each handbot effectively services a quarter of the media slots 130 (e.g., 362 of 1,448 media slots 130), but can physically pass each other to facilitate concurrent operations. Another implementation includes multiple (e.g., two) handbots per rail for further redundancy and/or concurrency. Some implementations include many other types of components that can be part of the illustrated subsystems or other subsystems that are not shown. For example, implementations can include one or more cartridge access ports (CAPs), power supplies and/or other power management components (e.g., AC, DC, three-phase, or other power supplies, power distribution units (PDUs), etc.), communications components (e.g., switches, hubs, servers, cables, ports, etc.), control cards, environmental sensors (e.g., fire detectors, etc.), structure (e.g., chassis, doors, service panels, open rack or shelf spaces, etc.), etc.

In some embodiments, functions of the media library system 105 can be accessed and/or controlled remotely. As illustrated, the media library system 105 can be in communication with a network 160, which can be further in communication with one or more host systems 170. For example, the host systems 170 provide remote user terminals and/or remote application interfaces by which other systems and/or human users can interact with the library. In some implementations, a host application 175 (e.g., a backup application) runs on the host system 170, which exploits the media library system 105 resources for data storage and input/output functions.

Figure 2:
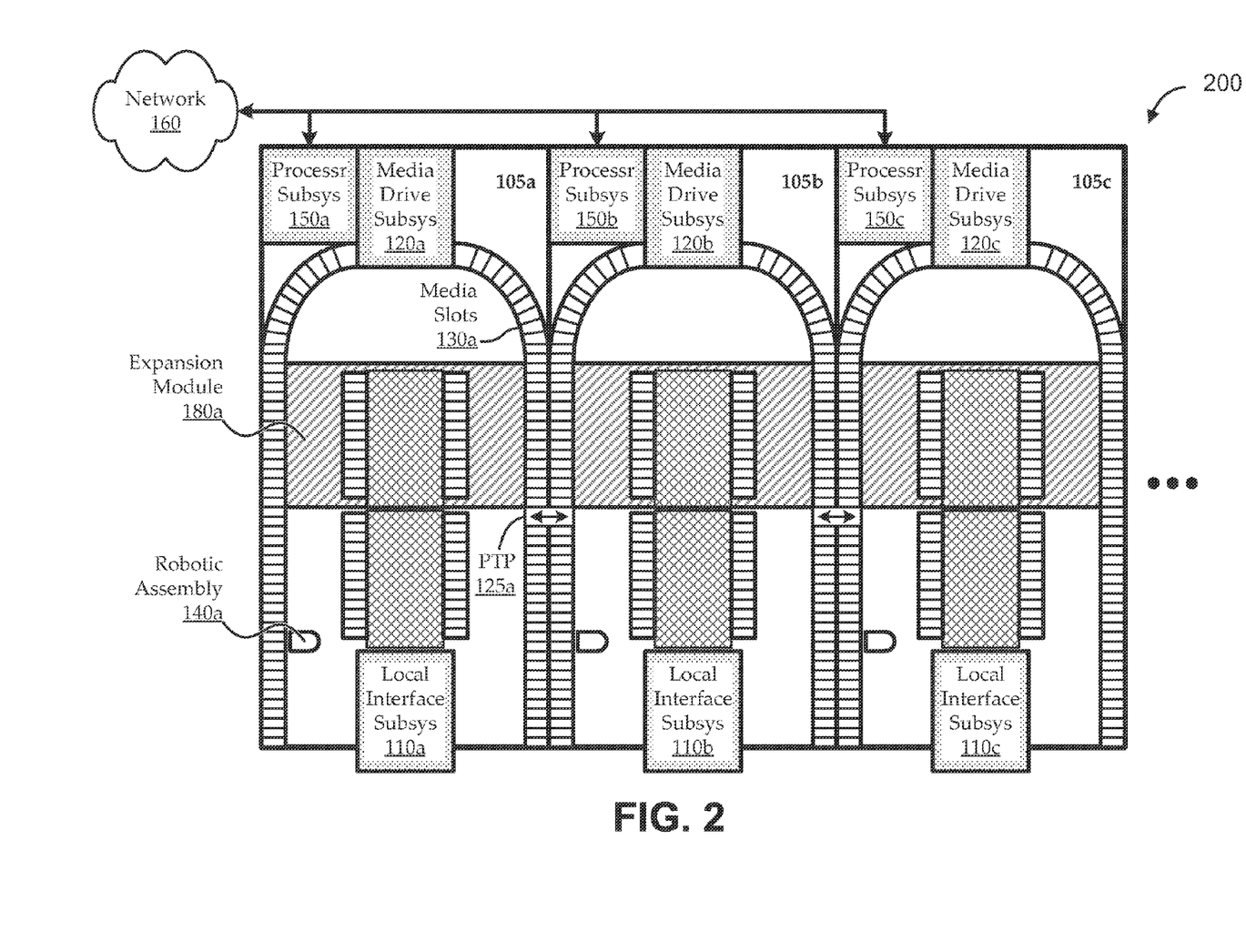
FIG. 2 shows an illustrative configuration of an expanded media library system implemented as a library complex.

Some embodiments of the media library system 105 can be expanded in one or more dimensions. FIG. 2 shows an illustrative configuration of an expanded media library system 105 implemented as a library complex 200. The library complex 200 includes a number of physically distinct media library systems 105. As illustrated, each media library system 105 can have its own local interface subsystem 110, media drive subsystem 120, processor subsystem 150, media slots 130, robotic assemblies 140, etc. Some or all of the individual media library systems 105 can also be expanded using expansion modules 180. For example, the expansion modules 180 are illustrated as adding media slots 130 to each media library system 105, but they can also or alternatively add media drives, processors, robotic assemblies 140, etc. in other implementations. In some implementations, the media library systems 105 are configured with pass-through ports (PTPs) 125, which can facilitate transferring of storage media from one media library system 105 to another media library system 105 in the library complex 200. It is noted that reference to the individual media library systems 105 as physically distinct is intended to include implementations in which there is limited physical interconnection among the libraries via PTPs, or the like.

The library complex 200 can be in communication with external interfaces in any suitable manner, for example, via one or more networks 160. The networks 160 can include any suitable communications framework, including local or wide-area communications, wired or wireless communications, secure or unsecure communications, etc. Communications can occur via "intra-complex" networks (e.g., a local-area network (LAN) between the media library systems 105 of the library complex 200) and/or via "external" networks. As used herein, an "external" network is intended to broadly include any network that facilitates communications to and/or from the library complex 200 (i.e., as opposed to only within the library complex 200). For example, the entire external network can be implemented as a LAN in a single room, along with the library complex 200 and one or more user terminals, or the external network can be implemented as the Internet, a distributed LAN, a wide-area network (WAN), or in any other suitable manner. In one implementation, each media library system 105 in the library complex 200 has its own, distinct communications path with one or more networks. This can provide certain features relating, for example, to redundancy, efficiency, security, etc. In another implementation, one media library system 105 of the library complex 200 is in direct communication with one or more networks, and the other media library systems 105 of the library complex 200 are in indirect communication with those networks via an intra-complex network. Some implementations use an Internet protocol (IP) network, so that communications can be implemented using standard IP techniques, browser-based graphical user interfaces (GUIs), standard transport mechanisms, etc. For example, intra-complex (or intra-library) communications within and/or between media library systems 105 and library components are implemented using Simple Network Management Protocol (SNMP), while communications with external networks and interfaces are implemented hypertext transport protocol (HTTP) and/or secure HTTP (HTTPS). Other communications can use proprietary or non-proprietary protocols, TCP/IP sockets, or any other suitable communications techniques.

Figure 3:
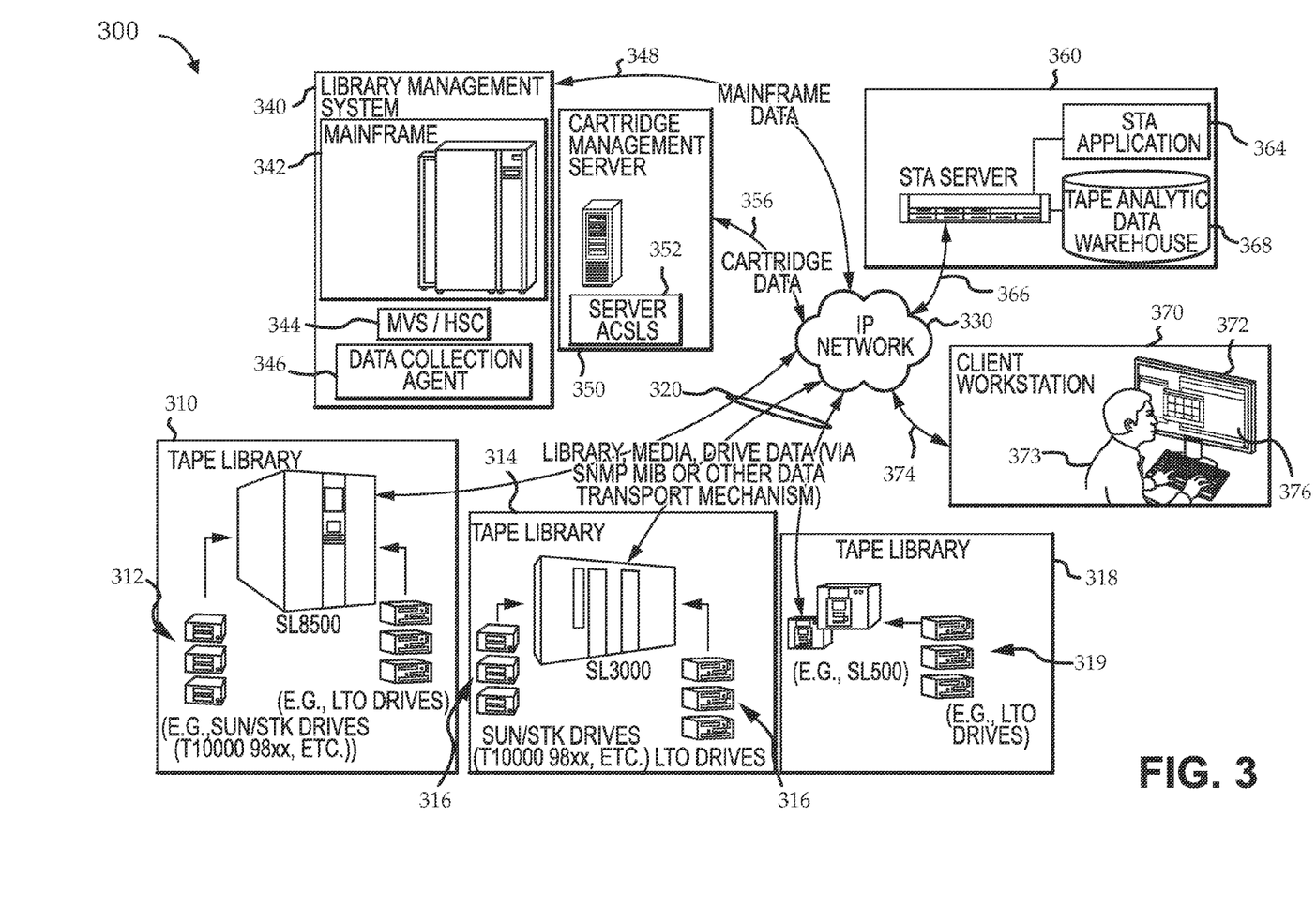
FIG. 3 shows a simplified diagram of an illustrative data storage system that provides further context for certain embodiments.

FIG. 3 shows a simplified diagram of an illustrative data storage system 300 that provides further context for certain embodiments. As illustrated, the system 300 includes a number of tape libraries 310, 314, 318, each with a number of tape drives 312, 316, 319. The tape libraries 310, 314, 318 can be implementations of the media library systems 105 of FIG. 1 or 2. For example, the libraries 310, 314, 318 may be implemented as Oracle's StorageTek libraries (e.g., the SL8500, SL3000, SL500, or similar or future libraries), and the drives 312, 316, 319 may be implemented Oracle's StorageTek drives (and media) (e.g., the T10000 A/B/C, T9840 C/D) or LTO 3/4/5 from HP and IBM. Tape media (e.g., cartridges) can be ferried between storage locations (e.g., a physical slot of a storage magazine) and one or more of the drives 312, 316, 319, where the tape media can be mounted and dismounted from the tape drives 312, 316, 319. Embodiments can perform MDV on the tape media and/or on the tape drives 312, 316, 319.

The data storage system 300 can include or be in communication with any suitable functional components. For example, as illustrated, embodiments can include or be in communication with a library management system 340, a cartridge management server 350, a storage tape analytics server 360, etc. Embodiments of the library management system 340 can include a mainframe or other computer device running an operating system and management software applications 344. For example, the operating system can be Multiple Virtual Storage (MVS) provided by IBM, and the management software can be Host Software Component (HSC) provided by Oracle, or any other suitable operating systems and/or library management software can be utilized. A data collection agent 346 can be provided in the data storage system 300 to collect library management-specific (e.g., HSC-specific) data 348, which can be transmitted (e.g., via IP network 330) to the STA server 360 or other components of the data storage system 300. Embodiments of the cartridge management server 350 can run one or more applications 352, such as Automated Cartridge System Library Software (ACSLS), to control an automated cartridge system; and cartridge management-specific (e.g., ACSLS-specific) data 356 can be provided by the application 352 (e.g., over IP network 330) to any suitable component of the data storage system 300 (e.g., to the STA server 360 for use in analytics of tape operations in the tape libraries 310, 314, 318). Embodiments of the STA server 360 can implement an STA application 364 to manage collection and storage of various analytics data 366 (e.g., including or derived from data 320, 348, 356) from various data sources, which can be collected in a tape analytics data warehouse 368 (e.g., a database(s) in memory of server 360 or accessible by server 360) for use in performing various analytics functions. Implementations of the STA application 364 can provide a data warehouse approach to management of a tape infrastructure, which can involve gathering/receiving a wide variety of analytics data 366, storing and processing the analytics data 366 in the database 368, performing analytics on the analytics data 366 (e.g., monitoring, validating, and/or predicting health issues, media integrity, drive integrity, etc.), presenting out analytics data 366 or data derived therefrom (e.g., predictive health attributes and results of validation of media/drives), etc. While the STA server 360 illustrates a direct library communication approach, other embodiments can include any suitable analytics frameworks.

Some embodiments permit receipt of client data 374 (e.g., instructions, queries, etc.) from and output of client data 374 (e.g., analytics data 366 or data derived therefrom) to one or more local interfaces, client workstations 370, etc. For example, a user 373 can interface with the data system 300 using a client node or workstation 370 via a monitor/display device 372 and/or any suitable user interface device. As described above, the various components, client workstations 370, and/or other elements of the data system 300 can communicate over any suitable communications framework, including local or wide-area communications, wired or wireless communications, secure or unsecure communications, etc. For example, implementations use an Internet protocol (IP) network (such as network 330) and standard IP techniques, browser-based graphical user interfaces (GUIs) 376, standard transport mechanisms, etc. Intra-library and/or intra-complex communications can be implemented using SNMP, while external communications (e.g., client workstations 370) can be implemented using HTTP or HTTPS.

Embodiments of the media library systems 105 (e.g., alone or in context of library complexes 200 and/or data storage systems 300) can perform various MDV functions. Such functions operate at both a physical and a logical level. The systems described in FIGS. 1-3 provide illustrative implementations of physical libraries having physical storage media located in physical media slots 130, and having physical media drives located in physical drive slots. Various functions, however, use a logical framework, in which one or more logical identifiers are used to address and interface with each media library system 105, each storage medium, each media drive, each drive slot, etc. For example, a host system can be in communication with library components via a data path and/or via a control path. A host application running on the host system may be able to address a particular storage medium by its present physical location (e.g., a media slot 130 array location, such as a column and row) and/or by its logical identifier (e.g., a volume serial (VOLSER) number, or the like), which may be translated into a physical location in some implementations. Similarly, the host application may be able to perform data input/output operations via a particular media drive using the drive's present physical drive slot location and/or by its logical identifier. According to some implementations, a local interface (e.g., local interface subsystem 110) can be used to access resources of a library by physical and/or logical addressing.

Figure 4:
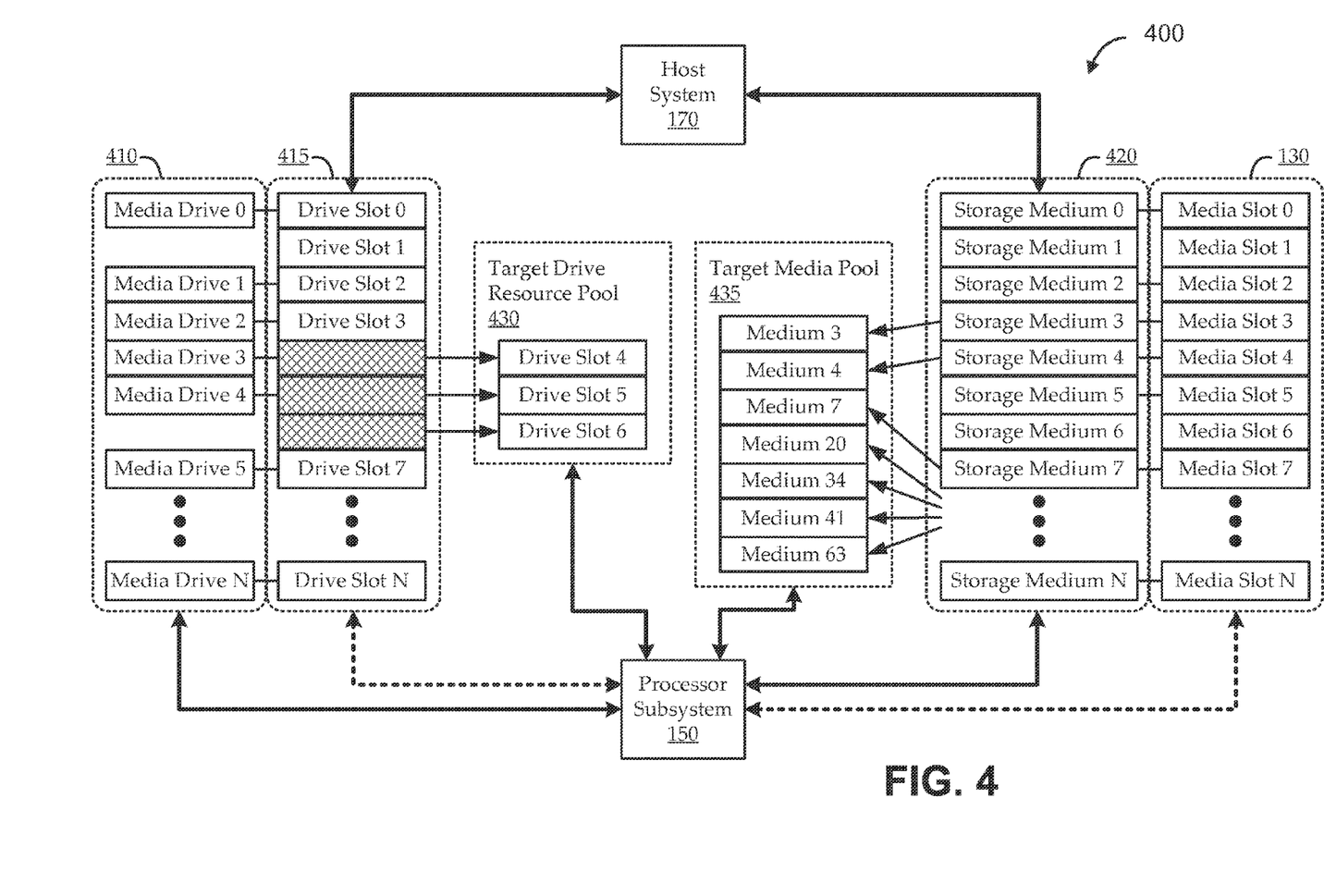
FIG. 4 shows an illustrative logical view of a storage library system for implementing MDV, according to various embodiments.

FIG. 4 shows an illustrative logical view of a storage library system 400 (e.g., a single media library system 105 or a library complex 200) for implementing MDV, according to various embodiments. The library environment 400 includes a number of media slots 130, at least some having tangible storage media 420 disposed therein, and a number of logical drive slots 415, at least some having tangible media drives 410 disposed therein. As described above, the physical implementation of the storage library system 400 can have one or more robotic assemblies 140 that operate to ferry the storage media between the media slots 130 and the media drives 410. In some embodiments, logical functions (e.g., data processing and other input/output functions) consider some or all of the physical components as addressable library resources. For example, a local or external application can interact with a "drive resource," which can represent a logical drive slot location (e.g., which, in turn, can correspond to an associated physical drive slot location and/or to whatever physical media drive, if any, is installed in the associated physical drive slot location), or a logical drive (e.g., according to logical drive information detected or generated by the library when the physical drive is logically installed). A local or external application can also interact with a "media resource," which can represent a logical storage media volume (e.g., which, in turn, can correspond to an associated physical media slot 130 location and/or to whatever physical storage medium, if any, is installed in the associated physical media slot 130 location).

Interacting with logical resources, as opposed to with the physical resources themselves, can provide certain features. Suppose, for example, that a library has twenty drive slots, but the library owner has only purchased and installed ten media drives (i.e., leaving ten empty slots). Further, suppose that the library owner typically desires to use all ten drives, except when performing periodic media/drive validation. In such a scenario, the library owner can assign ten drive slots (e.g., both physically and logically) to be "production" drive slots for use by the host applications, and the library owner can assign another four of the twenty total drive slots as "validation" drive slots for use during MDV. When it comes time for MDV, the library owner can physically move four of the ten media drives from production drive slots to validation drive slots, thereby allowing the MDV and host applications to proceed without having to make logical reassignments.

As illustrated, various library resources can be accessed by processors and/or related processing and control components of any suitable subsystems of the library (represented generally as a processor subsystem 150) and by one or more external interface systems (represented generally by a host system 170). Embodiments of the processor subsystem 150 operate to communicate with the robotic assemblies 140 and at least one host application of the host systems 170, and to perform MDV functions. As illustrated, the processor subsystem 150 can assign a selected set of the storage media 420 to a target media pool 435 in a manner that maintains visibility of the selected set of storage media by the at least one host application. The processor subsystem 150 can also assign a selected set of media drive resources (e.g., drive slots 415 and/or media drives 410) to a target drive resource pool 430 in a manner that hides visibility of the selected set of media drive resources from the at least one host application. For example, after the assignments are made, the host system 170 can interact with all the available storage media 420, regardless of whether a particular storage medium 420 is assigned to the target media pool 435; but the host system 170 can only interact with those drive resources (e.g., installed media drives 410 or logical drive slots 415) that have not been assigned to the target drive resource pool 430. In some embodiments, as described above, the storage library system 400 is implemented as a library complex, in which a number of storage library systems each defines a physically distinct environment for a respective portion of the complex-wide media slots 130, a respective portion of the complex-wide drive resources (e.g., media drives 410 and/or drive slots 415), and at least one of the robotic assemblies 140, while being logically interconnected (e.g., in logical communication). In some such implementations, the processor subsystem 150 (which may be distributed across multiple libraries in the complex) can assign the selected set of media resources to a single target media pool 435 and/or assign the selected drive resources to a single target drive resource pool 430, even though the media and/or drive resources are distributed among multiple libraries in the complex. In some embodiments, having made the resource assignments, embodiments can instruct a robotic assembly 140 to move at least one of the assigned storage media 420 in the target media pool 435 to at least one of the media drives 410 associated with a media drive resource in the target drive resource pool 430, and the processor subsystem 150 can perform MDV to validate the assigned media and/or drive resources.

Permitting or hiding visibility of library resources can be performed using various techniques. In some implementations, each drive resource operates to be logically accessible by the at least one host application via both a data path interface and a control path interface, and the processor subsystem 150 can hide the assigned drive resources by removing logical accessibility by the at least one host application to the selected set of drive resources via the data path interface. In other implementations, the processor subsystem 150 can hide the assigned drive resources from the at least one host application by assigning the selected drive resources to a library partition that the at least one host application does not have permission to access. For example, embodiments of the storage library system 400 permit logical partitioning of the library resources for any suitable purpose, and implementations can permit or deny access per partition, per host system 170, per host application, etc. Resource hiding can be implemented by assigning certain media drives 410 to a particular partition, and denying access (or otherwise logically hiding) the partition from any external applications, so as to be accessible only by the MDV functions.

The resources can be assigned in any suitable manner. In some implementations, resource assignments are performed by a human user via one or more local interface subsystems 110 (not shown) of the storage library system 400. For example, a local console in communication with the processor subsystem 150 receives selections, by a human user, of at least some of the selected set of storage media and the selected set of media drive resources. In other implementations, the processor subsystem 150 is in communication with a computer-implemented media analytics application interface and operates to perform the assigning steps in response to receiving a selection by the computer-implemented media analytics application of at least some of the selected set of storage media and the selected set of media drive resources. In one implementation, the computer-implemented media analytics application is one or more applications of the Storage Tape Analytics (STA) suite of applications provided by Oracle. For example, STA can monitor various data and statistics relating to the health of storage media 420 and media drives 410. STA can use the information either to automatically assign resources to a target media pool 435 and/or to a target drive resource pool 430, or to suggest resources for assignment to the pools (e.g., and a human user or other system can determine when and if to assign the suggested resources to appropriate pools).

As described above, though the assigned drive resources are hidden from the host system 170, the media resources can remain visible to the host system 170. Suppose, for example, that the host system 170 issues an access request (e.g., a read/write, auditing, or other request) for a particular storage medium 420 while that storage medium 420 is in the process of being validated by MDV (e.g., the storage medium 420 may be assigned to the target media pool 435 and not yet moved from its respective media slot 130, presently in a media drive 410 being validated, in transport on a robotic assembly 140, etc.). Embodiments can (e.g., in response to receiving the access request) interrupt execution of the media validation in response to the access request and can instruct the storage library system 400 to fulfill the access request with the particular storage medium 420. Coordination of the access request handling with the in-process MDV can be handled by the library (e.g., by the processor subsystem 150) in a manner that is effectively transparent to the host system 170. For example, the host system 170 may be wholly or partially unaware of the MDV operation, the status of the MDV operation, the present status of the requested storage media 420 with respect to the MDV operation, etc. In some implementations, the access request may be handled asynchronously with respect to the MDV operations.

The MDV operations can include any suitable type of media and/or drive validation. In some implementations, media validation can include performing a statistical analysis on a storage medium 420 (e.g., a tape cartridge) loaded in a media drive 410 (e.g., a tape drive) to analyze an operating parameter for the storage medium 420. The analyzed operating parameter can be a media performance parameter (e.g., a read quality index (RQI) or read margin, read or write speed, etc.), a data parameter (e.g., a data integrity analysis), a policy parameter (e.g., an age of the storage medium, etc.), a physical parameter (e.g., an integrity of a label or other feature of the storage medium itself), etc. Drives assigned to the target drive resource pool 430 can be predetermined to be "healthy" (e.g., sometimes referred to as "gold" or "qualifying") drives, so that any issues identified during the MDV can be attributed to the media being validated, and not to the drive being used for the validation. As a corollary, storage media for use in validating drives can be predetermined to be healthy, to have data integrity, etc. In some implementations, determining that a drive or medium is healthy involves a process that is similar to, or more rigorous than, MDV. For example, MDV may look for indications that a drive or medium is outside normal operating limits, while qualifying a drive or medium as healthy may involve appreciably tighter requirements (e.g., demonstration of a high RQI). Alternatively, a single medium can be validated in (or can be used to validate) multiple drives in an attempt to isolate any issues to a particular drive or medium; or other validation techniques can be used. Results of the MDV process can be used in a number of ways. In some implementations, the MDV results are displayed to a user (e.g., via a customer interface, host system, or the like). For example, having identified "unhealthy" media and/or drives, remediation actions can be taken, such as cleaning, copying, replacing, scratch pooling, or otherwise remediating the identified storage media condition.

Figure 5:
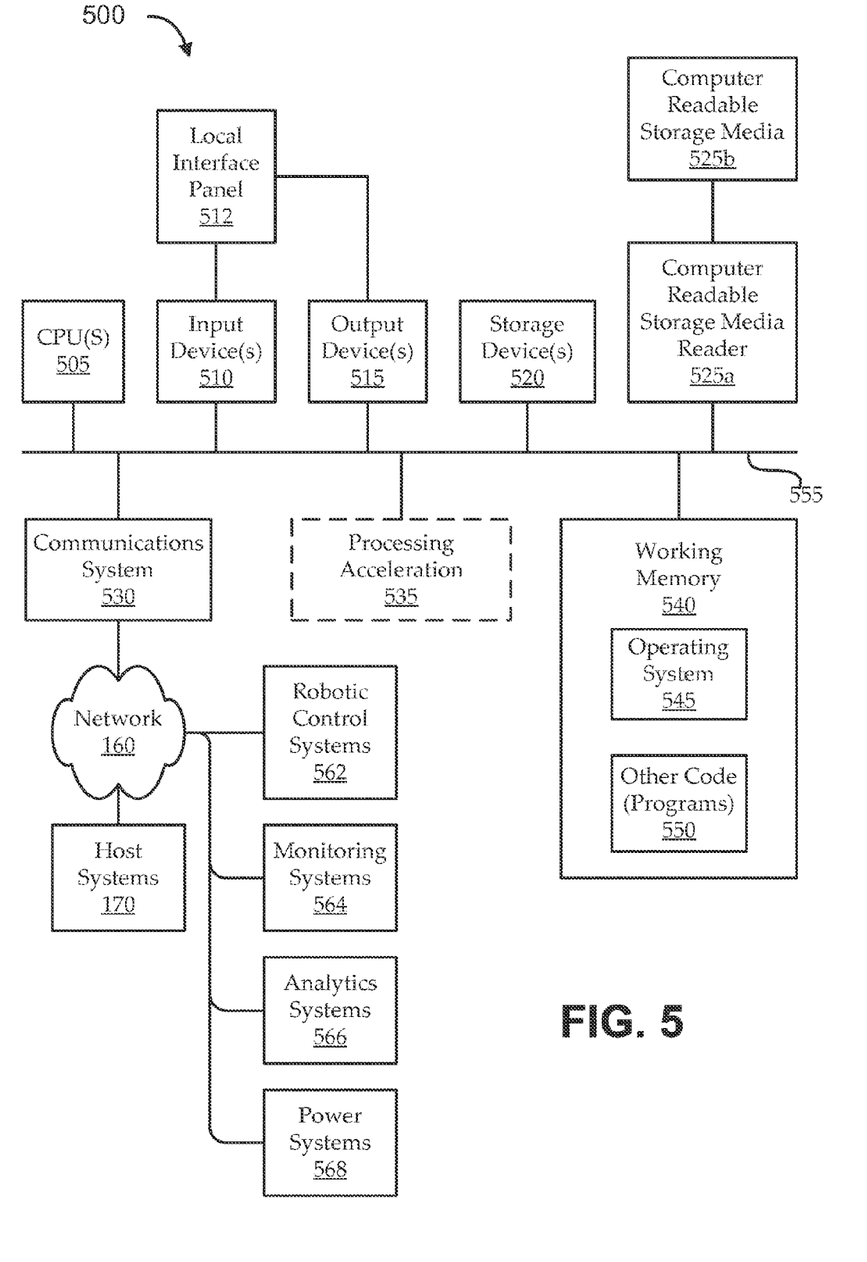
FIG. 5 shows an illustrative computational system for implementing functionality of various embodiments.

FIG. 5 shows an illustrative computational system 500 for implementing functionality of various embodiments. The computational system 500 can include or perform functions of the processor subsystem 150, for example, including the MDV functions described herein. For the sake of simplicity, the computational system 500 is shown including hardware elements that can be electrically coupled via a bus 555. However, embodiments of the computational system 500 can be implemented as or embodied in single or distributed computer systems, in one or more locations, or in any other useful way.

The hardware elements can include one or more central processing units (CPUs) 505, one or more input devices 510 (e.g., a mouse, a keyboard, etc.), and one or more output devices 515 (e.g., a display device, a printer, etc.). In some implementations, a local interface panel 512 (e.g., of the local interface subsystem 110) is used as an input and output device. The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. The computational system 500 can additionally include a computer-readable storage media reader 525a, which can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. In some embodiments, the computational system 500 can also include a processing acceleration unit 535, which can include a DSP, a special-purpose processor and/or the like.

The computational system 500 can also working memory 540, which can include RAM and ROM devices, for example, as described above. Software elements can be located within the working memory 540, for example, including an operating system 545 and/or other code 550, such as an application program (which can be a client application, web browser, mid-tier application, relational database management system (RDBMS), etc.). In some embodiments, one or more MDV functions are implemented as instructions stored as application code 550 in working memory 540, which, when executed, cause the one or more processors 505 to perform corresponding functions.

In some implementations, the computational system 500 includes a communications system 530 (e.g., a modem, a network card (wireless or wired), an infra-red communication device, etc.). The communications system 530 can permit data to be exchanged with a network 160 and/or any other computer described above with respect to the computational system 500. For example, via the network 160, the computational system 500 can communicate with one or more host systems 170, robotic control systems 562, monitoring systems 564, analytics systems 566, power systems 568, and/or any other suitable systems. Alternate embodiments of the computational system 500 can have numerous variations from those described above without departing from the scope of embodiments. For example, customized hardware might also be used and/or particular elements might be implemented in hardware, software (including portable software, such as applets), or both. Further, connection to other computing devices such as network input/output devices can be employed. In various embodiments of computational systems, like the one illustrated in FIG. 5, are used to implement one or more methods, such as those described below.

Figure 6:
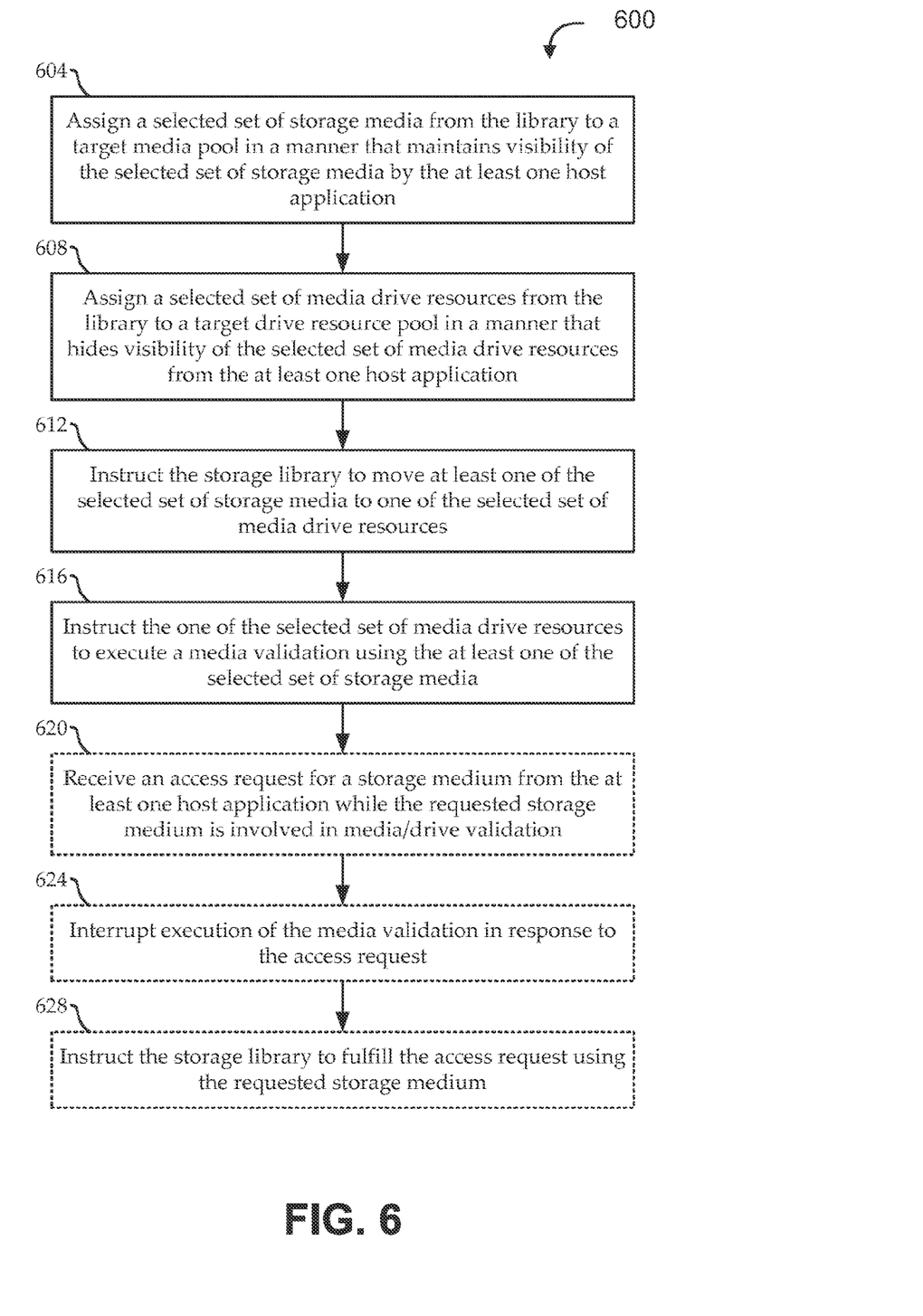
FIG. 6 shows a flow diagram of an illustrative method for validating media or media drives in a storage library.

FIG. 6 shows a flow diagram of an illustrative method 600 for validating media or media drives in a storage library. The method 600 operates in context of a storage library that is in communication with at least one host application and that has a number of storage media and a number of media drives. Embodiments begin at stage 604 by assigning a selected set of storage media from the library to a target media pool in a manner that maintains visibility of the selected set of storage media by the at least one host application. At stage 608, a selected set of media drive resources can be assigned from the library to a target drive resource pool in a manner that hides visibility of the selected set of media drive resources from the at least one host application. The sets of storage media and media drives can be selected (e.g., prior to beginning the method 600) by a human user via a console interface integrated with the storage library, by a human user via an external application interface in communication with the storage library, by a computer-implemented media analytics application interface in communication with the storage library, or in any other suitable manner. As described above, in some library complex implementations, the storage media and/or media drive resources can be selected from across the complex.

In some implementations, each media drive resource is logically accessible by the at least one host application via both a data path interface and a control path interface, and assigning the selected set of media drive resources in a manner that hides visibility from the at least one host application includes removing logical accessibility by the at least one host application to the selected set of media drive resources via the data path interface. In some such implementations, removing logical accessibility by the at least one host application to the selected set of media drive resources via the data path interface involves waiting for a logical indication that data path connections have been physically disconnected from each of the selected set of media drive resources before continuing with the method 600. For example, the method 600 can detect or wait for an indication that the data path cables coupling the selected media drives to the host applications have been disconnected from those selected media drives. In other implementations, assigning the selected set of media drive resources in a manner that hides visibility from the at least one host application involves assigning the selected set of media drive resources to a library partition that the at least one host application does not have permission to access.

The storage library can be instructed at stage 612 to move at least one of the selected set of storage media to one of the selected set of media drive resources. For example, a robotic assembly of the storage library can be instructed to pick the selected storage media from a physical library location and to place the selected storage media in a physical drive location corresponding to the one of the selected set of media drive resources. At stage 616, embodiments instruct the one of the selected set of media drive resources to execute a media/drive validation using the at least one of the selected set of storage media.

As described above, during media/drive validation, media drives assigned to the target drive resource pool may be inaccessible to the host applications, but the host applications may still be allowed to interact with storage media assigned to the target media pool. For the sake of illustration, some embodiments of the method 600 receive an access request at stage 620 for the at least one of the selected set of storage media from the at least one host application while the requested storage medium is involved in media validation. At stage 624, the method 600 can interrupt execution of the media validation in response to the access request. The storage library can be instructed at stage 628 to fulfill the access request using the requested storage medium.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A storage library system comprising:
a plurality of media slots, at least some having tangible storage media disposed therein;
a plurality of media drives that operate to receive the tangible storage medium for reading or writing;
a robotic assembly that operates to ferry the storage media between the media slots and the media drives; and
at least one processor that operates to communicate with the robotic assembly and at least one host application, and to perform steps comprising:
assigning at least one of the storage media to a target media pool of media/drive validation;
assigning at least one of the media drives to a target drive resource pool of the media/drive validation; and
executing the media/drive validation by:
instructing the robotic assembly to move the at least one storage medium to the at least one media drive; and
instructing the at least one media drive to execute the media/drive validation using the at least one storage medium,
wherein the assigning steps are performed in a manner that maintains visibility of the at least one storage medium by the at least one host application during the media/drive validation of the at least one storage medium and hides visibility of the at least one media drive from the at least one host application during the media/drive validation of the at least one media drive.

2. The system of claim 1, wherein:
the at least one media drive operates to be logically accessible by the at least one host application via both a data path interface and a control path interface; and
the at least one processor operates to assign the at least one media drive in a manner that hides visibility from the at least one host application by removing logical accessibility by the at least one host application to the at least one media drive via the data path interface.

3. The system of claim 1, wherein the at least one processor operates to assign the at least one media drive in a manner that hides visibility from the at least one host application by:
assigning the at least one media drive to a library partition that the at least one host application does not have permission to access.

4. The system of claim 1, wherein, in response to receiving an access request for the at least one storage medium from the at least one host application while the at least one media drive is executing a media/drive validation, the at least one processor further operates to perform steps comprising:
interrupting execution of the media/drive validation in response to the access request; and
instructing the storage library to fulfill the access request using the at least one storage medium.

5. The system of claim 1, further comprising:
a local console,
wherein the at least one processor is in communication with the local console and operates to perform the assigning steps in response to receiving a selection by a human user, via the local console, of at least some of the at least one storage medium and the at least one media drive.

6. The system of claim 1, wherein the at least one processor is in communication with a computer-implemented media analytics application interface and operates to perform the assigning steps in response to receiving a selection by the computer-implemented media analytics application of at least some of the at least one storage medium and the at least one media drive.

7. The system of claim 1, further comprising:
a plurality of storage libraries, each defining a physically distinct environment for a respective portion of the plurality of media slots, a respective portion of the plurality of media drives, and at least one of a plurality of robotic assemblies, the plurality of storage libraries being logically interconnected as a library complex,
wherein the at least one processor operates to assign the at least one storage medium to the target media pool, wherein the at least one storage medium comprises at least one storage medium disposed in the physically distinct environment of one of the plurality of storage libraries and at least one storage medium disposed in the physically distinct environment of another of the plurality of storage libraries.

8. The system of claim 1, wherein each of the at least one media drive is a physical media drive or a logical media drive slot.

9. The system of claim 1, wherein each of the at least one storage medium is a tape media cartridge.

10. The system of claim 1, wherein the at least one host application is a backup application.

11. A method for validating storage media and/or media drives in a storage library, the library in communication with at least one host application and comprising a plurality of storage media and a plurality of media drives, the method comprising:
assigning at least one of the storage media from the library to a target media pool of a media/drive validation;
assigning at least one of the media drives from the library to a target drive resource pool of the media/drive validation; and
executing the media/drive validation by:
instructing the storage library to move the at least one storage medium to the at least one media drive; and instructing the at least one media drive to execute the media/drive validation using the at least one storage medium,
wherein the assigning steps are performed in a manner that maintains visibility of the at least one storage medium by the at least one host application during the media/drive validation of the at least one storage medium and hides visibility of the at least one media drive from the at least one host application during the media/drive validation of the at least one media drive.

12. The method of claim 11, wherein:
the at least one media drive operates to be logically accessible by the at least one host application via both a data path interface and a control path interface; and
assigning the at least one media drive in a manner that hides visibility from the at least one host application comprises removing logical accessibility by the at least one host application to the at least one media drive via the data path interface.

13. The method of claim 12, wherein:
removing logical accessibility by the at least one host application to the at least one media drive via the data path interface comprises waiting for a logical indication that data path connections have been physically disconnected from each of the at least one media drive prior to performing the instructing the storage library step.

14. The method of claim 11, wherein assigning the at least one media drive in a manner that hides visibility from the at least one host application comprises:
assigning the at least one media drive to a library partition that the at least one host application does not have permission to access.

15. The method of claim 11, further comprising:
receiving an access request for the at least one storage medium from the at least one host application while the at least one media drive is executing the media/drive validation;
interrupting execution of the media/drive validation in response to the access request; and
instructing the storage library to fulfill the access request using the at least one storage medium.

16. The method of claim 11, wherein instructing the storage library to move the at least one storage medium to the at least one media drive comprises:
instructing a robotic assembly of the storage library to pick the at least one storage medium from a physical library location; and
instructing the robotic assembly to place the at least one storage medium in a physical drive location corresponding to the at least one media drive.

17. The method of claim 11, wherein at least some of the at least one storage medium and the at least one media drive are previously selected by a human user via a console interface integrated with the storage library.

18. The method of claim 11, wherein at least some of the at least one storage medium and the at least one media drive are previously selected by a human user via an external application interface in communication with the storage library.

19. The method of claim 11, wherein at least some of the at least one storage medium and the at least one media drive are previously selected by a computer-implemented media analytics application interface in communication with the storage library.

* * * * *